(12) United States Patent
Schubert

(10) Patent No.: US 11,305,384 B2
(45) Date of Patent: Apr. 19, 2022

(54) CARTESIAN POSITIONING DEVICE AND LASER-MACHINING HEAD HAVING SAME

(71) Applicant: Precitec GmbH & Co. KG, Gaggenau (DE)

(72) Inventor: Peter Schubert, Gaggenau (DE)

(73) Assignee: Precitec GmbH & Co. KG, Gaggenau (DE)

(*) Notice: Subject to any disclaimer, the term of this patent is extended or adjusted under 35 U.S.C. 154(b) by 79 days.

(21) Appl. No.: 16/603,101

(22) PCT Filed: Apr. 5, 2018

(86) PCT No.: PCT/EP2018/058698
§ 371 (c)(1),
(2) Date: Oct. 4, 2019

(87) PCT Pub. No.: WO2018/185208
PCT Pub. Date: Oct. 11, 2018

(65) Prior Publication Data
US 2020/0108467 A1    Apr. 9, 2020

(30) Foreign Application Priority Data
Apr. 5, 2017 (DE) ............... 10 2017 107 282.9

(51) Int. Cl.
*B23K 26/70* (2014.01)
*G02B 7/02* (2021.01)
(Continued)

(52) U.S. Cl.
CPC ............ *B23K 26/702* (2015.10); *G02B 7/023* (2013.01); *G02B 27/09* (2013.01); *G05B 19/402* (2013.01); *G05B 2219/45165* (2013.01)

(58) Field of Classification Search
CPC ...... B23K 26/702; B23K 26/70; G02B 7/023; G02B 27/09; G02B 7/004; G05B 19/402;
(Continued)

(56) References Cited

U.S. PATENT DOCUMENTS 4,767,188 A    8/1988  Myer
5,583,691 A    12/1996  Yamane et al.
(Continued)

FOREIGN PATENT DOCUMENTS

DE        2364026 A1    7/1974
DE    202015007130 U1    1/2016
(Continued)

OTHER PUBLICATIONS

International Search Report dated Jul. 6, 2018; International Application No. PCT/EP2018/058698.
(Continued)

*Primary Examiner* — Thomas C Lee
*Assistant Examiner* — Charles Cai
(74) *Attorney, Agent, or Firm* — Dinsmore & Shohl LLP

(57) ABSTRACT

According to the invention, a Cartesian positioning device for positioning an optics includes an optics socket for holding the optics; a y actuating element for linear movement of the optics socket in the y direction, the y actuating element having a y slider at one end; an x actuating element for linear movement of the optics socket in the x direction, the x actuating element having an x slider at one end; wherein the x actuating element and the y actuating element are arranged on a support element and adjustable along the y direction. Furthermore, a laser machining head for machining a workpiece by means of a laser beam includes such a Cartesian positioning device for positioning an optics, the optics being arranged in a beam path of the laser machining head.

16 Claims, 9 Drawing Sheets

(51) Int. Cl.
*G05B 19/402* (2006.01)
*G02B 27/09* (2006.01)

(58) Field of Classification Search
CPC .......... G05B 2219/45165; G05B 19/19; G05B 2219/35097; G05B 2219/45044; G05B 19/4093; G05B 19/25; G05B 19/4155; Y02P 90/02; B23Q 15/013
See application file for complete search history.

(56) References Cited

U.S. PATENT DOCUMENTS

| | | | | |
|---|---|---|---|---|
| 5,768,013 | A * | 6/1998 | Kraft | G02B 21/26 359/391 |
| 6,049,420 | A * | 4/2000 | Kraft | G02B 21/26 359/391 |
| 6,467,762 | B1 | 10/2002 | Davies | |
| 9,405,087 | B2 | 8/2016 | Grapov et al. | |
| 2006/0238902 | A1 | 10/2006 | Nakashima et al. | |
| 2008/0242380 | A1 * | 10/2008 | Kajihara | H04M 1/0225 455/575.4 |
| 2010/0014159 | A1 * | 1/2010 | Schnuell | G02B 21/26 359/393 |

FOREIGN PATENT DOCUMENTS

| | | |
|---|---|---|
| JP | 2000158171 A | 6/2000 |
| JP | 2004361862 A | 12/2004 |
| WO | 2013144084 | 10/2013 |

OTHER PUBLICATIONS

XP055485951; Thorlabs Tools of the trade vol. 18; Jan. 1, 2006.
XP055485952; New Focus Inc. Revised 1997/98, Catalog, vol. 8.2; Jan. 1, 1998.

* cited by examiner

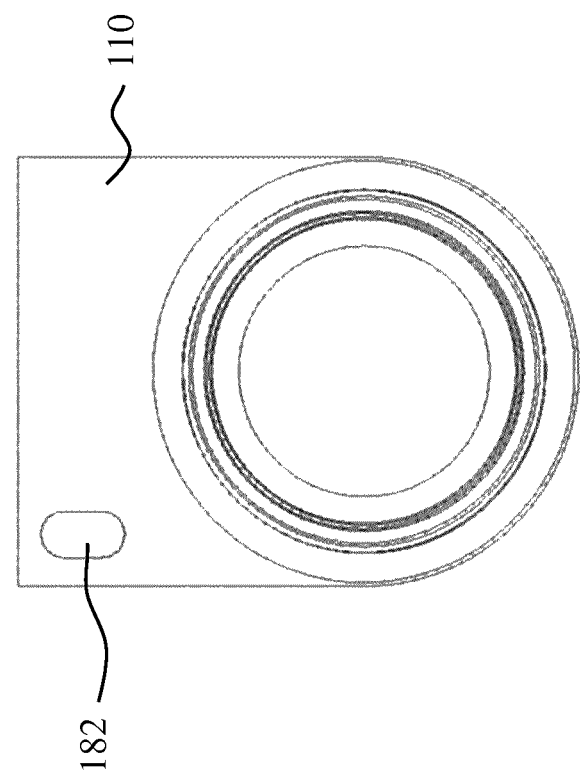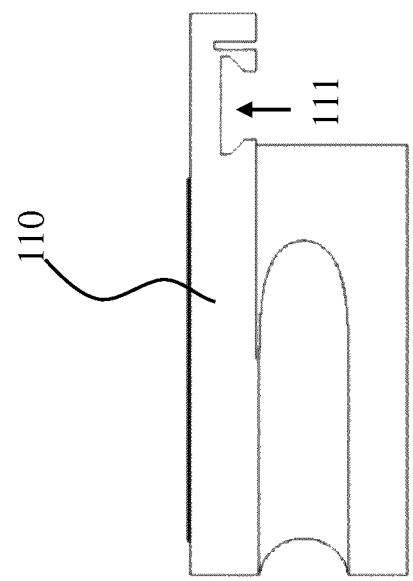
Fig. 7a
Fig. 7b

CARTESIAN POSITIONING DEVICE AND LASER-MACHINING HEAD HAVING SAME

CROSS-REFERENCE TO RELATED APPLICATIONS

This application is the U.S. national stage of PCT/EP2018/058698 filed Apr. 5, 2018, which claims priority of German Patent Application 10 2017 107 282.9 filed Apr. 5, 2017 both of which are hereby incorporated by reference in their entirety.

FIELD OF THE INVENTION

The invention relates to a Cartesian positioning device for positioning an optics and to a laser machining head comprising such a Cartesian positioning device for machining a workpiece by means of a laser beam.

BACKGROUND OF THE INVENTION

In many optics applications, an optics such as a lens or a beam shaping optics has to be adjusted independently in at least two directions. In particular in material machining by means of a laser beam, such as laser cutting or laser welding, an optical component arranged in the laser machining head for adjusting the laser beam via a fine nozzle bore of a laser machining head must be adjusted independently in two directions perpendicular to the optical axis of the laser machining head. In conventional positioning devices for positioning an optics, the problem arises that the optics is not displaced exactly linearly or not displaced on mutually perpendicular axes. This makes a precise adjustment difficult and affects a reproducibility of a desired position.

Moreover, in particular in optics applications in the field of laser machining, the problem exists that, for example in a laser machining head, only a small amount of space is available for the positioning device for positioning the optics. The accessibility for operating personnel is severely limited in space, so that the operating elements for positioning the optics along two Cartesian axes, which are conventionally arranged on different sides, are difficult to reach.

In prior art, it is also not possible to assign an exact value of a corresponding movement of the optics along a particular axis to a setting of an actuating element.

In JP 2004-361862A, a condenser system for a laser machining device is disclosed, wherein a lens may perform a movement in two-dimensional directions perpendicular to the optical axis. For this purpose, two sets of micrometer and spring are arranged orthogonally to each other.

Therefore, the invention is based on the object to provide a Cartesian positioning device for positioning an optics and a laser machining head therewith, allowing for the optics to be independently positioned in two directions in a compact and simple design and with improved ease of use.

This object is achieved by a Cartesian positioning device for positioning an optics according to claim 1 and a laser machining head for machining a workpiece by means of a laser beam including the same according to claim 15. Advantageous embodiments and further developments of the invention are described in the dependent claims.

According to the invention, a Cartesian positioning device for positioning an optics comprises a first actuating element, or y actuating element, for linear movement of an optics socket along a first Cartesian axis, i.e., in the y direction, and a second actuating element, or x actuating element, for linear movement of the optics socket along a second Cartesian axis, i.e., in the x direction, wherein the first and second actuating elements are both adjustable along the first Cartesian axis, i.e., along the y direction. Of course, the first and second Cartesian axes, i.e., the y direction and the x direction, are perpendicular to each other. In other words, the x and y actuating elements may be adjustable in parallel to each other. The actuating elements may be formed, for example, as threaded spindles. This allows for a compact design and independent positioning along two Cartesian axes. The Cartesian axes, i.e., x axis and y axis, denote the axes of a Cartesian coordinate system, the third axis of which is the z axis.

Preferably, the two actuating elements are arranged in juxtaposition on a support element to which the optics socket is attached. This allows for clear operability and simplified accessibility.

In a preferred embodiment, at least one of the two actuating elements is calibrated. In other words, a certain adjustment value of one of the actuating elements may be assigned to a specific value for the linear movement along the corresponding Cartesian axis. For this purpose, the y actuating element and/or the X actuating element each comprise a micrometer screw. As a result, a positioning of the optics is reproducible and an exact positioning of the optics in an optical system is simplified.

One end of the y actuating element may be formed as a y slider. Similarly, one end of the x actuating element may be formed as an x slider. The y slider may movably connect the y actuating element to the optics socket. The x slider may connect the x actuating element to the optics socket. The x slider and/or the y slider may be guided along at least one slider guide element.

The y actuating element or the y slider may be coupled to the optics socket by means of a linear guide unit in the x direction movable. For example, the y actuating element or the y slider and the optics socket may be movably connected to each other via a rail or carriage system. Preferably, the linear guide unit includes a first part arranged on one selected from the y actuating element (or y slider) and the optics socket, and a second part arranged on the other selected from the y actuating element (or y slide) and the optics socket. Here, the first part of the linear guide unit may have an undercut, in which a projection formed in a corresponding shape of the second part of the linear guide unit is guided. An example of the linear guide unit is a dovetail guide. Preferably, the connection of the y actuating element or the y slider with the optics socket has high tensile and/or compressive strength. As a result, an exact adjustment of a desired position, e.g., by pushing or pulling, is possible without being affected by backlash in the connection.

A transmission element may be disposed between the x slider and the optics socket. The transmission element may be connected movably in x direction to the support element or mounted therein. The transmission element may be movably connected to the optics socket by a first guide unit. The first guide unit may be configured to guide the optics socket in the y direction. For example, the first guide unit comprises a linear guide unit, such as a dovetail guide. The first guide unit may comprise a first guide extending in the y direction, e.g. an elongated hole, and a first guide pin guided therein. The first guide may be formed in one selected from the transmission element and the optics socket, and the first guide pin may be formed in the other selected from the transmission element and the optics socket. The transmission element may be movably connected to the x slide by a second guide unit. The second guide unit may be configured to convert an adjusting movement of the x actuating element along the y direction into a movement of the transmission element along a predetermined direction, which forms an angle of less than 90° with the y direction, preferably an angle of approximately 45°. The second guide unit may comprise a second guide extending in the predetermined direction, e.g. an elongated hole, and a second guide pin guided therein. The second guide may be formed in one selected from the transmission element and the x actuating element (or x slider), and the second guide pin may be formed in the other selected from the transmission element and the x actuating element (or x slider). By adjusting the x actuating element (or the x slider) in y direction, the second guide unit may move the transmission element and thus the optics socket in the x direction. Preferably, the linear displacement of the x actuating element along the y direction is converted by the diagonally oriented second guide into a movement of the transmission element in the x-y plane. By means of the linear guide unit, which couples the y actuating element and the optics socket with each other, the movement of the transmission element may be converted into a linear movement of the optics socket in the x direction.

The x actuating element or the x slider may be movably coupled to the optics socket via a lever element. Thus, an adjustment of the x actuating element may be transmitted to the optics socket via a lever element. Preferably, the lever element has a first end and a second end, wherein the lever element is coupled to the x actuating element or the x slider at its first end and to the support element at its second end. The lever element may be coupled to the optics socket at a point between the first end and the second end. The lever element may be connected to the support element via a rotary joint. Preferably, the lever element is mounted pivotally in the x-y plane on the support element. Furthermore, the lever element may be movably connected to the optics socket by a first guide unit. Likewise, the lever element may be movably connected to the x actuating element or to the x slider by a second guide unit. The first guide unit may be configured to guide the optics socket linearly in the y direction. Preferably, the first guide unit also allows rotation of the lever about the first guide pin. The second guide unit may be configured to transmit an adjusting movement of the x actuating element to the lever element. The linear adjusting movement of the x actuating element along the y direction is preferably converted into a pivoting movement of the lever element in x-y plane. The second guide may be bent or curved. Preferably, the second guide unit allows rotation of the lever about the second guide pin. By means of the linear guide unit coupling the y actuating element and the optics socket with each other, the pivotal movement of the lever element may be converted into a linear movement of the optics socket in the x direction.

The lever element may be L-shaped. In this case, the lever element may be coupled to the optics socket in the region in which both legs of the L-shape meet. The first guide unit may therefore be arranged at a cusp of the L-shaped lever element. The L-shape of the lever element allows for an even more compact design.

SUMMARY OF THE INVENTION

In a preferred embodiment, a portion of the first guide unit, e.g. the first guide pin or the first guide, is arranged on a fastening extension of the optics socket. The fastening extension of the optics socket may extend towards the support element. This allows for a compact arrangement of the transmission elements of the x and y adjusting movement on the optics socket.

The first guide unit may comprise a first guide pin and a first guide. Similarly, the second guide unit may comprise a second guide pin and a second guide. Here, the first guide pin and/or the second guide pin are preferably formed on the lever element or on the transmission element. This simplifies the production processes. The first and/or second guide may include a recess, a guide groove, or a hole, in particular an elongated hole. The first guide is preferably formed on the optics socket. The second guide is preferably formed on the x actuating element or x slider.

Furthermore, at least one slider guide element guiding a movement of the x slider or the y slider in y direction may be provided. The slider guide element may be used as a guide pin or guide rib either on the x or y slider or be formed on the support element. A corresponding groove or bore, in which the slider guide element is guided, may be formed on the other of the x or y slider and the support element. The slider guide element may also be formed as a part of a dovetail guide, wherein the other part of the dovetail guide may be formed in the x or y slider. Thereby, a y adjustment of the x or y slider may be stabilized.

Furthermore, at least one spring element may be arranged between the optics socket and the support element. The spring element may be configured to provide a restoring force on the optics socket towards the support element. This also serves to stabilize the movement of the optics socket. In addition, idling upon directional change can be prevented by the restoring force of the spring element.

Furthermore, according to the invention, a laser machining head for machining a workpiece by means of a laser beam comprises a Cartesian positioning device for positioning an optics according to one of the exemplary embodiments described. Preferably, the optics is arranged in a beam path of the laser machining head. The support element of the Cartesian positioning device may be attached by means of fasteners, e.g., screws, to a housing of the laser machining head. An optical axis of the laser machining head preferably extends in the z direction of the Cartesian coordinate system, i.e., perpendicular to the x-y plane.

The terms x direction, x actuating element, x slider are equivalent to the first direction, first actuating element, first slider, respectively, and may be replaced thereby. The terms y direction, y actuating element, y slider are equivalent to the second direction, second actuating element, second slider, respectively, and may be replaced thereby. The first or x direction is perpendicular to the second or y direction.

BRIEF DESCRIPTION OF THE DRAWINGS

The invention will be exemplarily explained in more detail below with reference to the drawings.

FIGS. 7a and 7b are a plan view and a side view, respectively, of an optics socket of the Cartesian positioning device of FIG. 5.

DETAILED DESCRIPTION OF THE INVENTION

Figure 1:
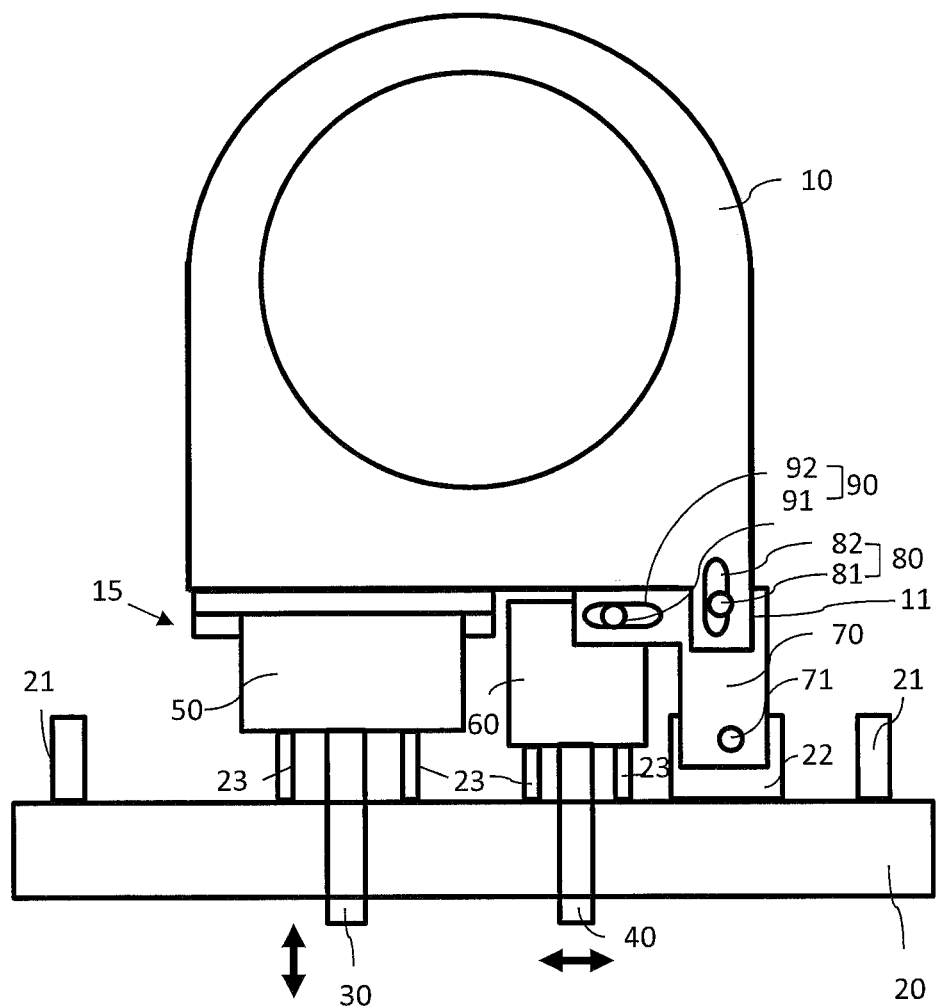
FIG. 1 is a schematic plan view of a Cartesian positioning device according to one embodiment of the present invention.

In the figures, components corresponding to each other are provided with the same reference numerals.

FIG. 1 shows a schematic plan view of a Cartesian positioning device for positioning an optics according to a first embodiment of the present invention. The positioning device comprises a support element 20 with an optics socket 10 for holding an optics attached thereto. The support element 20 may be fastened to a housing of a laser machining head via fasteners 21 such as screws such that the optics can be arranged in the beam path of the laser machining head. The optics socket 10 can be linearly displaced by means of two actuating elements 30 and 40 along a first and a second Cartesian axis, respectively. Here, a displacement along the first Cartesian axis is independent of a displacement along the second Cartesian axis. The two Cartesian axes are referred to as x axis and y axis below and are axes of a Cartesian or orthogonal coordinate system. Similarly, a movement in the x direction or in the y direction denotes a movement along the x axis or along the y axis. A movement in the x direction is independent of a movement in the y direction and therefore has no component in the y direction.

The first actuating element for displacing the optics socket 10 along the y axis, i.e., the y actuating element 30, penetrates the support element 20 such that one end of the y actuating element 30 is accessible from an outside of the support element 20 for a positioning process of the optics socket 10 in the y direction. At the other end of the y actuating element, a y slider 50 via which the y actuating element 30 is coupled to the optics socket 10 is arranged. Here, the y slider 50 and the optics socket 10 are movably connected to each other via a linear guide unit 15.

The linear guide unit 15 may include, for example, a carriage formed on the y slider 50 and a rail guide formed on the optics socket 10. The linear guide unit 15 is arranged in the x direction and allows a linear movement of the optics socket 10 in the x direction. The y slider 50 may, for example, have a dovetail groove in which a suitably shaped rail of the optics socket 10 is guided. Of course, a dovetail groove may also conversely be provided on the optics socket 10 and the corresponding rail may be provided on the y slider 50. Preferably, the linear guide unit 15 is configured such that the connection between the y slider 50 and the optics socket 10 has high tensile and compressive strength. This can prevent idling when changing direction of the y adjusting movement. During an adjusting movement of the y actuating element 30 in the y direction, the y slider 50, which is fixedly coupled to the optics socket 10 in the y direction, is likewise displaced in the y direction and correspondingly displaces the optics socket 10 by pushing or pulling along the y axis.

The second actuating element for displacing the optics socket 10 along the x axis, i.e., the x actuating element 40, also penetrates the support element 20, so that one end of the x actuating element 40 is accessible from an outside of the support element 20 for a positioning process of the optics socket 10 in x direction. At the other end of the x actuating element 40, an x slider 60 is arranged, which is movably coupled to the optics socket 10 via a lever element 70.

The lever element 70 is fastened to the support element 20 via a rotary joint 71 such that the lever element 70 is pivotable about the swivel joint 71 in the x-y plane. For this purpose, the support element 20 may have a fastening extension 22 which extends from an inside of the support element 20 in the y direction to the optics socket 10 in order to facilitate a pivoting movement of the lever element 70 about the rotary joint 71. The lever element 70 is movably connected to the optics socket 10 via a first guide unit 80 and to the x slide 60 via a second guide unit 90. When the lever element 70 is L-shaped, as shown in FIG. 1, the rotary joint 71 may be provided at one end of the L-shape, the first guide unit 80 at the cusp where both legs of the L-shape meet, and the second guide unit 90 at the other end. This allows for a space-saving arrangement for converting the linear adjusting movement of the x actuating element 40 in the y direction into a pivoting movement of the lever element 70 in the x-y plane.

The first guide unit 80 comprises a first guide pin 81 which runs in a first guide 82. For example, the first guide 82 extends straight in the y direction. Preferably, the first guide pin 81 is formed on the lever element 70, while the first guide 82 such as a groove or an elongated hole is formed in the optics socket 10. The first guide unit 80 thus allows a linear movement of the optics socket 10 in the y direction. For performing a pivotal movement of the lever element 70 about the rotary joint 71, the second guide unit 90 further comprises a second guide pin 91 which runs in a second guide 92. Although it is shown differently in the figures for the sake of simplicity, the second guide 92 such as a groove or an elongated hole is preferably formed on the x slider 60, while the second guide pin 91 is provided on the lever element 70. However, the invention is not limited thereto. Forming the first guide pin 81 and/or the second guide pin 91 on the lever element 70 simplifies the manufacture, however. The second guide 92 may be bent or curved. Both the first guide 82 and the second guide 92 allow for a rotational movement of the respective first and second guide pins 81 and 91.

During an adjusting movement of the x actuating element 40 along the y axis, the lever element 70 is pivoted about the rotary joint 71, whereby the optics socket 10, which is fixed in y direction by the linear guide unit 15, is displaced along the linear guide unit 15 in the x direction. An adjusting movement of the y actuating element 30 is transmitted directly to the optics socket 10 via the y slider 50, wherein the optics socket 10 is linearly guided in y direction by the first guide unit 80.

The optics socket 10 may have a fastening extension 11 extending from the optics socket 10 in the y direction towards the support element 20. On the fastening extension 11, a part of the first guide unit 80, i.e., the first guide pin 81 or the first guide 82, may be arranged. This also allows for a compact arrangement of the elements for converting the adjusting movement of the x actuating element 40 in y direction into a movement along the x axis of the optics socket 10.

Both the y actuating element 30 and the x actuating element 40 are fixed axially, so that a movement of the optics socket 10 in the other Cartesian direction is prevented. Both the y actuating element 30 and the x actuating element 40 are adjustable in parallel to each other along the y direction. The x and/or y actuating element is preferably calibrated such that a precise value of the displacement of the optics socket 10 along the corresponding Cartesian axis can be assigned to a specific adjusting movement. As a calibrated actuating element, for example, a micrometer may be used.

In order to stabilize the movement of the y slider 50 and the x slider 60, slider guide elements 23 such as guide pins which run in a corresponding bore of the y slider 50 and the x slider 60, respectively, may be provided on the support element 20. Alternatively, the slider guide elements 23 may also be provided on the y slider 50 or on the x slider 60 and guided in corresponding bores in the support element 20.

Figure 2:
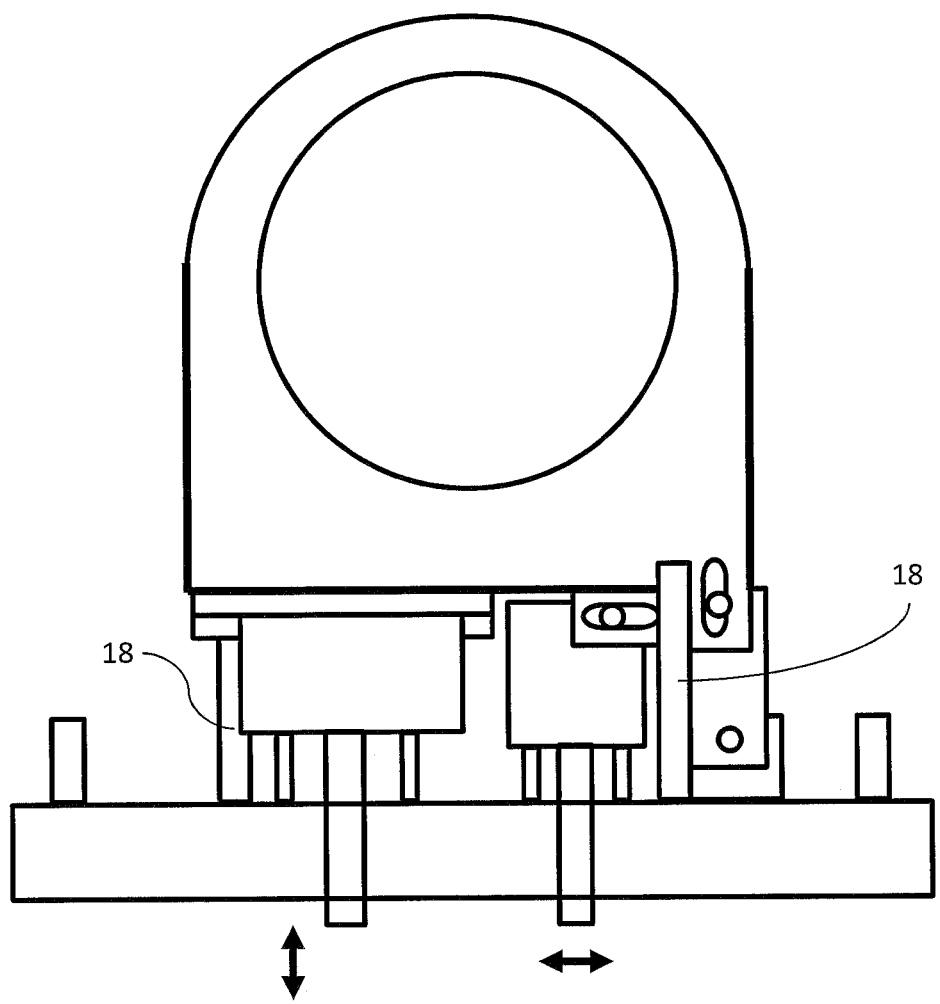
FIG. 2 is a plan view of the Cartesian positioning device of FIG. 1 with two spring elements.

FIG. 2 shows the Cartesian positioning device of FIG. 1, wherein further spring elements 18 are provided between the optics socket 10 and the support element 20 to prevent idling when changing direction.

Figure 3:
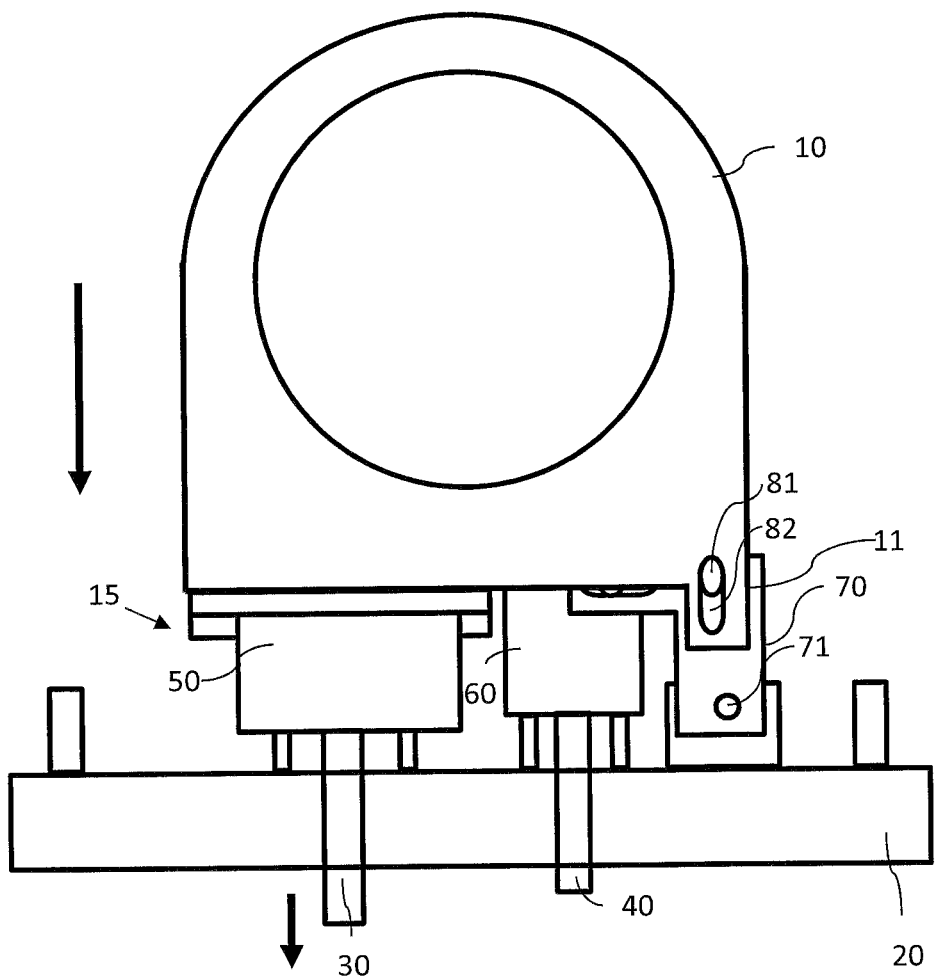
FIG. 3 is a plan view of the Cartesian positioning device of FIG. 1 which is displaced in the y direction.

FIG. 3 shows the Cartesian positioning device from FIG. 1, wherein the y actuating element 30 has been displaced by a predetermined amount in the y direction (downwards). As a result, the optics socket 10 connected to the y actuating element 30 via the linear guide unit 15 and the y slider 50 is also pulled in the y direction, the first guide pin 81 being displaced in the first guide 82.

Figure 4:
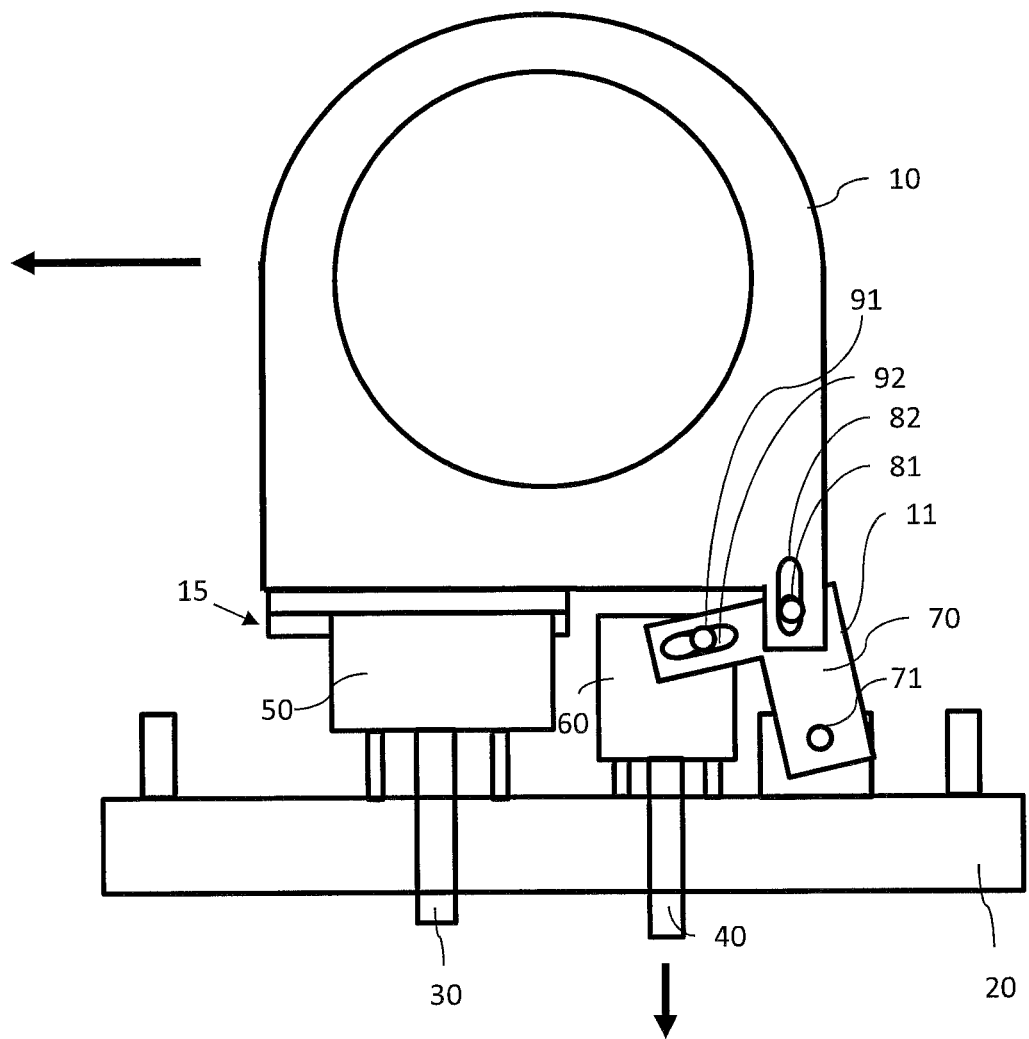
FIG. 4 is a plan view of the Cartesian positioning device of FIG. 1 which is displaced in the x direction.

FIG. 4 shows the Cartesian positioning device of FIG. 1, wherein the x actuating element 40 has been displaced by a predetermined amount in the y direction (downwards). As a result, the lever element 70 is pivoted about the rotary joint 71 in the x-y plane, the second guide pin 91 being guided along the second guide 92. The pivoting movement of the lever element 70 is transmitted to the optics socket 10 via the first guide unit 80 and converted into a linear x movement by the linear guide unit 15.

FIGS. 5 to 8 show a second embodiment of the Cartesian positioning device according to the invention. In this embodiment, instead of the pivoting movement of the lever element 70, a diagonal displacement of a transmission element 170 is used for converting the adjusting movement of the x positioning element 140 in the y direction into a displacement of the optics socket 110 in the x direction. This allows for a compact, stable, and backlash-free design.

Figure 5A:
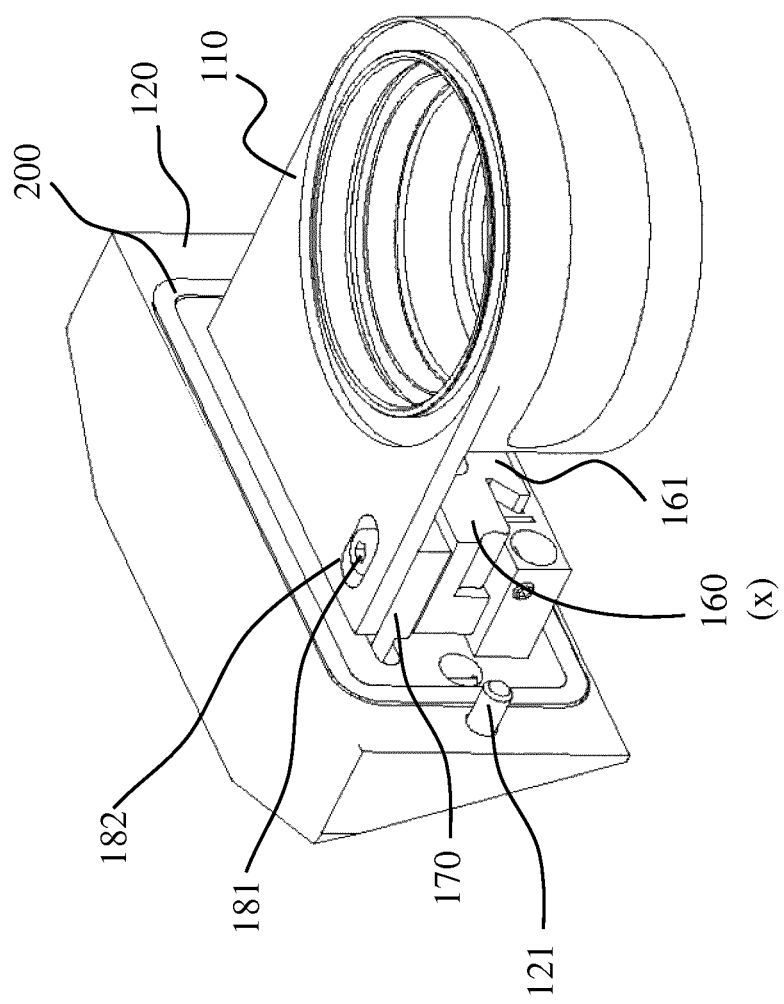
FIGS. 5a and 5b are perspective side views of the Cartesian positioning device according to another embodiment.
Figure 5B:
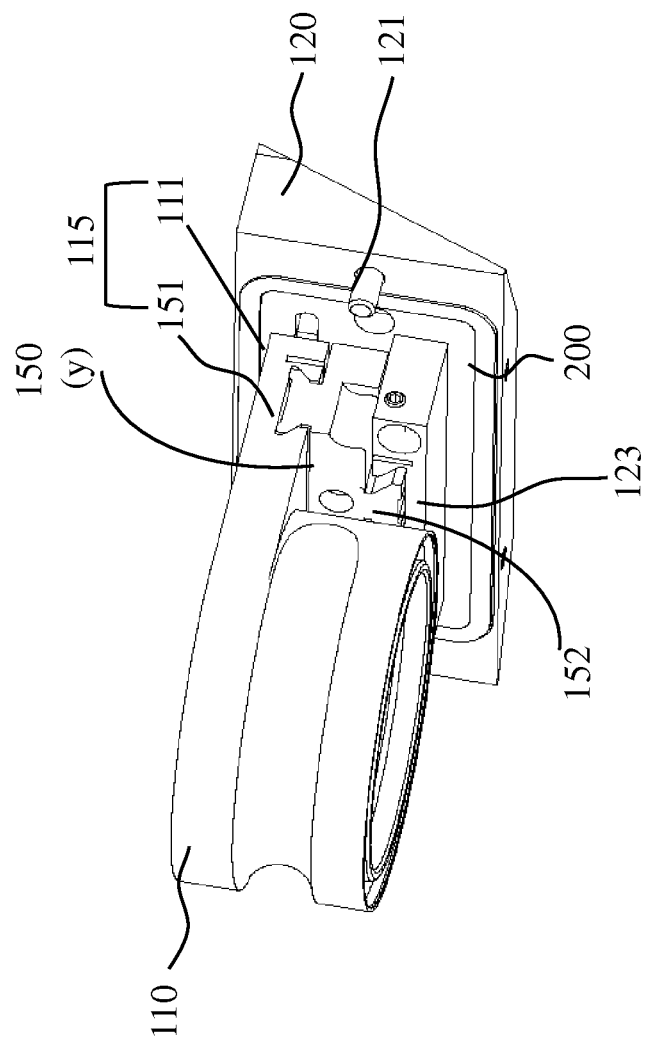

FIGS. 5a and 5b show perspective side views of the Cartesian positioning device according to the second embodiment. As in the first embodiment, the positioning device comprises a support element 120 on which an optics socket 110 for holding an optics is mounted adjustably in the x direction and in the y direction. The support element 120 may comprise fasteners 121 for fastening to a laser machining head. Further, a sealing element 200 may be provided to seal the support element 120 and the laser machining head from dust particles and the like. For displacing the optics socket 110, a y actuating element 130 and an x actuating element 140 (see FIG. 6b) which are adjustable in parallel to one another in the y direction and each have a y slider 150 and an x slider 160 are provided on the support element 120. Between the x slider 160 and the optics socket 110, a transmission element 170 is arranged in order to convert an adjusting movement of the x actuating element 140 or x slider 160, which is performed in the y direction, into a displacement of the optics socket 110 in the x direction. In FIG. 5a, a first guide 182 in which a first guide pin 181 of the transmission element 170 is guided in the y direction is formed in the optics socket 110 is apparent. This allows for a displacement of the optics socket 110 in the y direction with respect to the x slider 160.

As can be seen in FIG. 5b, the y slider 150 is connected to the optics socket 110 via a linear guide unit 115 configured to guide a movement of the optics socket 110 or the y slider 150 in the x direction. Here, an x linear guide element 111 is formed on the optics socket 110 and a corresponding x linear guide element 151 is formed on the y slider 150. The linear guide unit 115 may comprise a dovetail guide as shown in FIG. 5b.

A notch, in which at least one spring element 118 may be inserted, may be provided in the optics socket 110, as shown in FIGS. 5a and 5b, in order to connect the optics socket 110 to the support element 120. The at least one spring element 118 may be arranged to provide a restoring force on the optics socket 110 towards the support element. For example, the at least one spring element 118 may extend around one side of the optics socket 110 and be attached to the support element 120 adjacent to the x slider 160 and the y slider 150, respectively. As a result, tolerances in the adjusting movement of the actuating elements 130 and 140 or in the movement of the optics socket 110 can be reduced.

In order to stabilize at least one of the y slider 150 and the x slider 160, a slider guide element 123 being configured for a linear guide in the y direction may be provided. For example, the slider guide element 123 may be rod-shaped and guided in a bore of the y slider 150 and the x slider 160, respectively. Alternatively, at least one dovetail guide may be formed in the slider guide element 123 to guide the y slider 150 and the x slider 160 in the y direction, respectively.

Figure 6A:
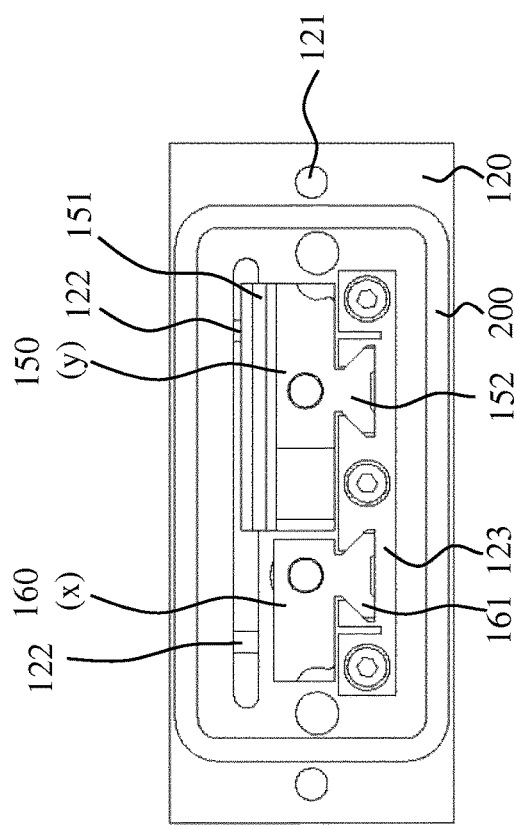
FIGS. 6a and 6b are a front view and a top view, respectively, of a portion of the Cartesian positioning apparatus of FIG. 5.
Figure 6B:
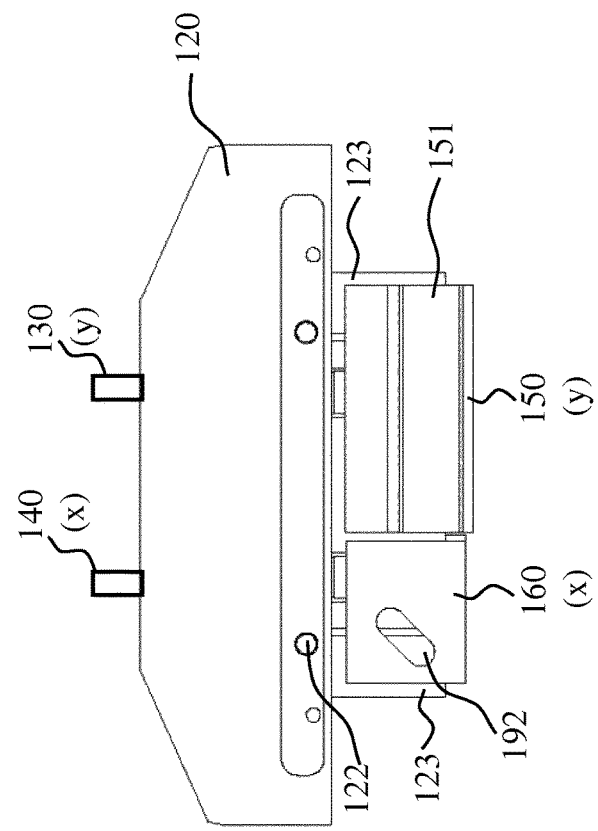

In FIGS. 6a and 6b, a part of a positioning device without the optics socket 110 and the transmission element 170 is shown. The support element 120 and the transmission element 170 may be coupled via an x linear guide unit. For this purpose, the support element 120 may preferably have a guide slot which extends in the x direction and into which at least a part of the transmission element 170 is inserted. Alternatively, the support element 120 may be coupled to the transmission element 170 by a dovetail guide. Furthermore, at least one fastening element 122 may be provided in the support element 120 in order to connect the transmission element 170 to the support element 120. In FIG. 6a, for example, two rod-shaped fastening elements 122, such as screws or bolts, are shown arranged in the guide slot of the support element 120. The fastening elements 122 are inserted into the transmission element guides 171 shown in FIG. 8a in order to couple the transmission element 170 to the support element 120 movably in the x direction. Alternatively, the transmission element 170 may comprise guide pins which run in a groove formed in the support element 120 or in the guide slot.

In FIG. 6a, a slider guide element 123 with two dovetail guides for stabilizing both the y slider 150 and the x slider 160 is shown. Of course, only one of the two sliders 150 and 160 can be guided by the slider guide element 123. A corresponding counterpart to the guide of the slider guide element 123 is formed as a y linear guide element 152 in the y slider 150 or as a y linear guide element 161 in the x slider 160. The y slider 150 may thus comprise two mutually perpendicular linear guide elements, such as the x linear guide element 151 for guiding the optics socket 110 in the x direction on the y slider 150 and the y linear guide element 152 for guiding the adjusting movement of the y slider 150 in the y direction. The x slider 160 may comprise at least the y linear guide element 161 for guiding the adjusting movement of the x slider 160 in the y direction. But one or more additional linear guide elements may be provided. For example, interacting linear guide elements may be provided on the x slider 160 and the y slider 150 in order to stabilize a relative movement with respect to each other in the y direction.

In FIG. 6b, the x linear guide element 151 of the y slider 150 on which the optics socket 110 is displaceable in the x direction is shown. In addition, the x slider 160 includes a diagonal guide or second guide 192 forming an angle of approximately 45° with the y direction or with the x direction. In the second guide 192 of the x slider, a second guide pin 191 of the transmission element 170 is inserted (see FIG. 8*b*) in order to displace the transmission element 170 in a direction of about 45° with respect to the y direction in an adjusting movement of the x slider 160 in the y direction.

FIGS. 7*a* and 7*b* show views of the optics socket 110. The optics socket 110 includes an x linear guide element 111 forming a linear guide unit with the x linear guide element 151 of they slider 150. In other words, the optics socket 110 and they slider 150 are coupled to each other movably in the x direction via a linear guide. The optics socket 110 also includes a first guide 182 guiding a movement in the y direction. The first guide 182 is formed at an angle 45° with respect to the second guide 192 in the x slider 160. A first guide pin 181 of the transmission element 170 is inserted into the first guide 182 of the optics socket 110 in order to allow a movement of the optics socket in the y direction with respect to the x slider.

Figure 8A:
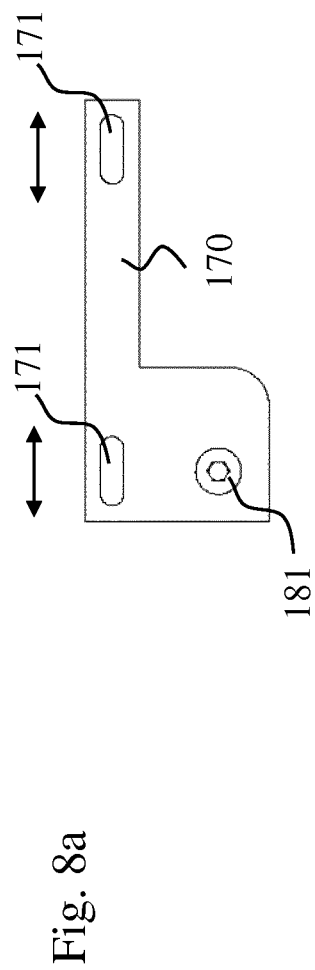
FIGS. 8a and 8b are a plan view and a side view, respectively, of a transmission element of the Cartesian positioning device of FIG. 5.
Figure 8B:
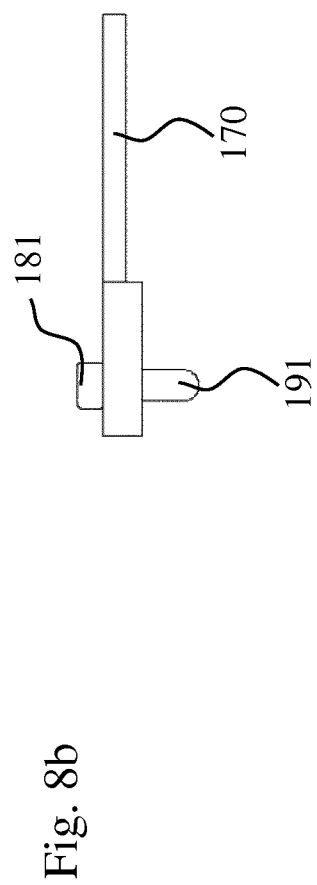

In FIGS. 8*a* and 8*b*, the transmission element 170 is shown. The transmission element 170 preferably has an L-shape, on one leg of which at least one transmission element guide 171, such as a slot or elongated hole (extending in the x direction), is formed, and on the other leg of which the first and second guide pins 181 and 191 protrude in opposite directions perpendicular to the x and y directions. In other words, the first and second guide pins 181 and 191 are formed on opposite surfaces of the transmission element 170. The first and second guide pins 181 and 191 may also be formed by a bolt or screw that penetrates the transmission element. Since the first guide pin 181 in the first guide 182 of the optics socket 110 is guided in the y direction, the optics socket 110 may be displaced in the y direction when the y slider 150 is moved with respect to the x slider 160. By guiding the second guide pin 191 of the transmission element 170 coupled to the optics socket 110 in the diagonal guide 192 of the x slider 160 and by means of the linear guide unit 115 which couples the optics socket 110 and the y slider 150 in the x direction, an adjusting movement of the x slider 160 in the y direction is converted or transmitted into a displacement of the optics socket 110 in the x direction.

It is to be understood that concave or convex portions, e.g. a linear guide or a dovetail guide, are interchangeable.

Thus, according to the invention, a Cartesian positioning device allowing for accurate and reproducible positioning of an optics in the x direction and in the y direction may be provided, wherein the positioning in the two Cartesian directions x and y is independent of each another. In addition, by using calibrated actuating elements, such as micrometer screws, an accurate value of the linear movement of the optics socket 10 along the corresponding x or y axis can be assigned to a specific adjusting movement or a rotation angle of the actuating element. Since both the y actuating element 30 and the x actuating element 40 are adjustable in the same direction, i.e., in parallel to each other along the y direction, both actuating elements 30 and 40 can be arranged next to each other on the support element 20. As a result, accessibility of the actuating elements for a user is improved and a space-saving arrangement of the actuating elements is made possible.

LIST OF REFERENCE NUMERALS

10 optics socket
11 fastening extension
15 linear guide unit
18 spring element
20 support element
21 fastener
22 fastening extension
23 slider guide element
30 y actuating element
40 x actuating element
50 y slider
60 x slider
70 lever element
71 rotary joint
80 first guide unit
81 first guide pin
82 first guide
90 second guide unit
92 second guide pin
92 second leadership
110 optics socket
111 x linear guide element
115 linear guide unit
118 spring element
120 support element
121 fastener
122 fastener
123 slider guide element
130 y actuating element
140 x actuating element
150 y slider
151 x linear guide element
152 y linear guide element
160 x slider
161 y linear guide element
170 transmission element
171 transmission element guide
181 first guide pin
182 first guide
191 second guide pin
192 second guide
200 sealing element

The invention claimed is:

1. A Cartesian positioning device for positioning an optics for a laser machining head, comprising:
   a support element;
   an optics socket for holding the optics;
   a y slider arranged on the support element, the y slider being movable in a y direction;
   an x slider arranged next to the y slider on the support element, the x slider being movable in the y direction;
   a single linear guide unit extending in the x direction and directly interconnecting the optics socket to the y slider such that the optics socket is movable in the x direction relative to the y slider by the linear guide unit;
   a L-shaped element with one or more guide slots or guide pins for translating y movement to x movement, the element interconnecting the optics socket with the x slider such that movement of the x slider in the y direction is translated into movement of the optics socket in the x direction;
   wherein the optics socket is connected to the x slider only by the element for translating y movement to x movement and the optics socket is connected to the y slider only by the single linear guide unit.

2. The Cartesian positioning device according to claim 1, wherein said single linear guide unit connects said y actuating element to said optics socket in a manner invariant with respect to a tensile or compressive load along the y axis.

3. The Cartesian positioning device according to claim 1, wherein said x slider and/or said y slider is guided along at least one slider guide element.

4. The Cartesian positioning device according to claim 1, wherein at least one spring element is connected to said optics socket and said support element.

5. A laser machining head for machining a workpiece by means of a laser beam, comprising:
   a Cartesian positioning device for positioning an optics according to claim 1;
   wherein said optics is arranged in a beam path of said laser machining head.

6. The laser machining head according to claim 5, wherein an optical axis of the laser machining head extends in a z direction perpendicular to the x direction and the y direction.

7. The Cartesian positioning device of claim 1, wherein the element for translating y movement to x movement comprises a transmission element arranged on the support element and movable in the x direction relative to the support element, the transmission element interconnecting the optics socket with the x slider such that movement of the x slider in the y direction is translated into movement of the optics socket in the x direction.

8. The Cartesian positioning device of claim 7, wherein:
   the x slider has a slot defined therein, the slot extending at an angle to the x and y directions;
   the optics socket having a slot defined therein, the slot extending in the y direction; and
   the transmission element interconnects the slot in the optics socket with the slot in the x slider such that movement of the x slider in the y direction is translated into movement of the optics socket in the x direction.

9. The Cartesian positioning device of claim 8, wherein the transmission element having a first and a second pin extending therefrom, the first pin engaging the slot in the x actuating unit and the second pin engaging the slot in the optics socket such that movement of the x actuating unit in the y direction pushes the first pin in the x direction, thereby moving the second pin and the optics socket in the x direction.

10. The Cartesian positioning device of claim 1, further comprising:
    a y actuating element disposed on the support, the y actuating element operable to move the y slider in the y direction; and
    an x actuating element disposed on the support, the x actuating element operable to move the x slider in the y direction.

11. The Cartesian positioning device according to claim 10, wherein a specific value for the linear movement in the y direction or x direction is assigned to an adjustment value of said y actuating element or said x actuating element, respectively.

12. The Cartesian positioning device according to claim 10, wherein the x actuating element and the y actuating element are arranged next to each other on the support element.

13. The Cartesian positioning device of claim 1, wherein the element for translating y movement to x movement comprises a lever element.

14. The Cartesian positioning device of claim 13, wherein the lever element is L-shaped.

15. The Cartesian positioning device of claim 13, wherein the lever element is movably connected to said optics socket by a first guide unit and to said x slider by a second guide unit, wherein said first guide unit comprises a first guide pin and a first guide for guiding said optics socket in the y direction, and wherein said second guide unit comprises a second guide pin and a second guide for transmitting an adjusting movement of said x slider to the lever element.

16. The Cartesian positioning device according to claim 15, wherein at least a part of said first guide unit is arranged on a fastening extension extending from said optics socket in the y direction.

\* \* \* \* \*